United States Patent
Liu et al.

(10) Patent No.: US 7,753,080 B2
(45) Date of Patent: Jul. 13, 2010

(54) THREE-DIMENSIONALLY INTERSECTING DIVERTER AS AN INNER MEMBER FOR A PIPE, BARREL OR TOWER

(76) Inventors: Zhaoyan Liu, B-2105, Huida Apartment 3 Block, Xiluoyuan, Fengtai District, Beijing (CN) 100077; Jingyun Shi, B-2105, Huida Apartment 3 Block, Xiluoyuan, Fengtai District, Beijing (CN) 100077

( * ) Notice: Subject to any disclaimer, the term of this patent is extended or adjusted under 35 U.S.C. 154(b) by 804 days.

(21) Appl. No.: 10/570,362

(22) PCT Filed: Aug. 30, 2004

(86) PCT No.: PCT/CN2004/001002

§ 371 (c)(1),
(2), (4) Date: Dec. 4, 2006

(87) PCT Pub. No.: WO2005/042138

PCT Pub. Date: May 12, 2005

(65) Prior Publication Data

US 2007/0186988 A1    Aug. 16, 2007

(30) Foreign Application Priority Data

Sep. 5, 2003    (CN)    ................. 03 1 56621

(51) Int. Cl.
*F15D 1/02*    (2006.01)
(52) U.S. Cl. ............. 138/39; 138/42; 138/44; 366/337; 366/340
(58) Field of Classification Search ............ 138/39, 138/42, 44; 366/337, 340
See application file for complete search history.

(56) References Cited

U.S. PATENT DOCUMENTS

| 1,022,493 | A |   | 4/1912 | Meigs |
|---|---|---|---|---|
| 1,454,196 | A |   | 5/1923 | Trood |
| 1,466,006 | A |   | 8/1923 | Trood |
| 3,051,452 | A |   | 8/1962 | Nobel |
| 3,128,794 | A | * | 4/1964 | Boucher et al. ............... 138/37 |
| 3,239,197 | A |   | 3/1966 | Tollar |

(Continued)

FOREIGN PATENT DOCUMENTS

WO    WO 99/00180    1/1999

(Continued)

*Primary Examiner*—James F Hook
(74) *Attorney, Agent, or Firm*—Thomas J. Perkowski, Esq. PC

(57) ABSTRACT

A diverter for arrangement in a pipe, a barrel or a tower, and including an even number ($\geqq 4$) of conical cavities arranged annularly, all of the conical cavities converging at the center of the diverter. The intersection point of the axial lines of the odd numbered conical cavities and the intersection point of the axial lines of the even numbered conical cavities are located at both sides of and symmetrical about the center of the diverter. As fluid flows through the diverter, the fluid material in the central fluid and edge zones interchange position and produce three-dimensionally intersecting flow. The diverter can efficiently improve the effects of heat and mass transfer, and can be widely used in static mixers, heat exchangers for fluid with high viscosity, temperature homogenizers of the exit of the screw extruder, high efficiency pipe reactors, and in the occasions of fluid-fluid extraction, solid-fluid extraction, etc.

13 Claims, 2 Drawing Sheets

U.S. PATENT DOCUMENTS

| | | |
|---|---|---|
| 3,404,869 A | 10/1968 | Harder |
| 3,557,830 A | 1/1971 | Raw |
| 3,671,208 A | 6/1972 | Medsker |
| 3,893,654 A | 7/1975 | Miura et al. |
| 4,164,375 A | 8/1979 | Allen |
| 4,179,222 A * | 12/1979 | Strom et al. ............... 366/337 |
| 4,374,542 A * | 2/1983 | Bradley ..................... 165/166 |
| 4,461,579 A | 7/1984 | McCallum |
| 4,848,920 A * | 7/1989 | Heathe et al. .............. 366/339 |
| 5,423,608 A | 6/1995 | Chyou et al. |
| 5,518,311 A | 5/1996 | Althaus et al. |
| 5,803,602 A | 9/1998 | Eroglu et al. |
| 7,198,400 B2 * | 4/2007 | Unterlander et al. ........ 366/336 |
| 2002/0110047 A1 * | 8/2002 | Bruck et al. ................ 366/340 |
| 2003/0165080 A1 * | 9/2003 | Pinyayev et al. ............ 366/337 |
| 2004/0008576 A1 * | 1/2004 | Henning ..................... 366/337 |

FOREIGN PATENT DOCUMENTS

| | | |
|---|---|---|
| WO | WO 00/21650 | 4/2000 |

\* cited by examiner

THREE-DIMENSIONALLY INTERSECTING DIVERTER AS AN INNER MEMBER FOR A PIPE, BARREL OR TOWER

RELATED CASES

This Application is a National Phase Entry Application of International Application PCT/CN2004/001002 filed Aug. 30, 2004 and published as WIPO Publication No. WO 2005/042138 A1 on May 12, 2005; which is a Continuation-in-Part of Chinese Application NO. 03156621.9 filed Sep. 5, 2003; each said application being incorporated herein by reference.

FIELD OF THE INVENTION

The present invention relates to an inner member for a pipe, a barrel or a tower, and more particularly, to a three-dimensionally intersecting diverter as an inner member for a pipe, a barrel or a tower, which can eliminate radial difference of the fluid state, improve the fluid transmission quality and increase the efficiencies of heat transfer, mass transfer or chemical reaction with relatively lower flowing resistance.

BACKGROUND OF THE INVENTION

As material flows through a hollow pipe, a barrel or a tower, the velocity in the central zone is higher, while the velocity in the edge zone is lower, so the residence time distribution of the material in the pipe, the barrel or the tower is quite wide. If the flowing process is accompanied with heat emission or heat absorption, or the material is heated or cooled with jackets, the heat transfer resistance may cause a temperature difference between the central zone and the edge zone. If a chemical reaction occurs, the differences in residence time and temperature may induce nonhomogeneity in composition between the central zone and the edge zone.

The most direct method to overcome these problems is to make material in the central zone and the edge zone in the pipe, barrel or tower to regularly exchange their positions, provided there is no dead space or shortcut, and to do so with low resistance, so as to make an arbitrary particle experience similar radial coordinate change during flowing through the pipe, barrel or tower. When performing a chemical reaction or a mass transfer in a heterogeneous system with a tower apparatus, the two-phase materials involved should remain in counter-current plug flow as long as possible, in order to obtain maximum reaction or mass transferring impetus. Also, the dispersed phase material should be divided into minimum particles, droplets or bubbles, dispersed uniformly in the continuous phase material, in order to provide maximum reaction or mass transferring interface.

To meet the above requirements, there are many plate towers and packed towers with various structural forms in industrial operation at the present time, but their efficiency needs to be improved and operating flexibility needs to be further extended.

SUMMARY OF THE INVENTION

The present invention provides a second generation of three-dimensionally intersecting diverters as inner members for a pipe, a barrel or a tower. The present invention is developed on the basis of the three-dimensionally intersecting diverter as an inner member for a tower, barrel or pipe, disclosed in Chinese Patent No. ZL 01100022.8 by Applicants. The present invention retains the features and advantages of the first generation of three-dimensionally intersecting diverters and further simplifies the structure, lowers the resistance, and provides a better overall performance.

The present invention provides a three-dimensionally intersecting diverter as an inner member for a pipe, barrel or tower, which is characterized in that one or more tiers of these dimensionally intersecting diverters 2 are arranged in a pipe body, a barrel body or a tower body 1; said three-dimensionally intersecting diverter 2 comprises an even number (4) of cone-like pipe cavities (hereinafter referred to as "conical cavity") 2-1 arranged annularly, as shown in FIG. 2. The conical cavity has a bigger port at the outer end and a smaller port at the inner end. The number of conical cavities in a three-dimensionally intersecting diverter 2 is determined by the nominal diameter of the three-dimensionally intersecting diverter 2, the process requirements and the process medium. The bigger the nominal diameter of the three-dimensionally intersecting diverter 2 is, the more the number of conical cavities are required. Likewise, the higher the requirements for mixing degree are, the more the number of conical cavities are required; and, the higher the viscosity of the process medium is, the less the number of the conical cavities are required. Preferably, the number of conical cavities in the three-dimensionally intersecting diverters of a pipe is 4, 6 or 8, while the number of conical cavities in the three-dimensionally intersecting diverters 2 of a tower can be more.

At the same time, in order to facilitate the fabrication, a pair of small cones can be additionally provided at the center of the three-dimensionally intersecting diverter 2, positioned in opposite directions. All of the conical cavities converge at the midpoint of the axis at the center of the three-dimensionally intersecting diverter 2. Each conical cavity comprises two side surfaces 2-1-1, an outer surface 2-1-2 and an inner surface 2-1-3. The side surfaces are the quadrilateral flat surfaces or curved surfaces shared by the two adjacent conical cavities; the outer surface is a curved surface or a bent flat surface; and the inner surface is a sectorial chambered surface, a flat surface or a bent flat surface. The axial lines of the odd-numbered conical cavities in the three-dimensionally intersecting diverter 2 are distributed on a conical surface, with the intersection point of the axial lines being the vertex of the cone; and the axial lines of the even-numbered conical cavities are distributed on another inverse conical surface, with the intersection point of the axial lines also being the vertex of the other cone. The intersection point of the axial lines of the odd-numbered conical cavities and the intersection point of the axial lines of the even-numbered conical cavities are located to each side of the center of the three-dimensionally intersecting diverter 2, respective and symmetric to each other.

Another structural form of the conical cavity of the three-dimensionally intersecting diverter 2 provided by the present invention shrinks the inner surface into a line segment which is the intersecting line of the two side surfaces. And the inner ends of all the line segments centralize at the center of the three-dimensionally intersecting diverter 2. Herein, the conical cavity consists of only two sheets of side surface 2-1-1 shared by the left and right adjacent cavities and one outer surface 2-1-2.

The cone-like pipe cavity may also be other pipe cavities with abnormal shapes. The projection of the outer contour surface 3 of the three-dimensionally intersecting diverter 2 on a cross section plane of the three-dimensionally intersecting diverter is a whole circle with the diameter equal to the inner diameter of the matching pipe, barrel or tower. The projections of the lower and upper inner contour lines or surfaces 4 of the three-dimensionally intersecting diverter on a cross section plane of the three-dimensionally intersecting diverter are circles or other closed curves which divide the section of a pipe, barrel or tower at both sides of the three-dimensionally intersecting diverter into two portions, with the inner portion being a central zone and the outer portion being an edge zone. And the ratio of the area of the central zone to the area of the edge zone is about 0.1-4.2, preferably 0.3-1.5.

The height to diameter ratio of the three-dimensionally intersecting diverter is 0.2-3, preferably 0.6-1.5.

The three-dimensionally intersecting diverter of the present invention can also fit with other pipes, barrels or towers which have non-circle sections, such as squares, ellipses or other abnormal shapes; in these cases, the outer contour of the three-dimensionally intersecting diverter matches with the inner walls of the pipes, barrels or towers shaped in squares, ellipses or other abnormal shapes.

The three-dimensionally intersecting diverter of the present invention can cause the fluid to flow in three dimensions in the body of a pipe, barrel or tower. When the material flows through the three-dimensionally intersecting diverter, the material originally in the central zone flows from the inner port to the outer port of the conical cavities by baffling of the inner surface 2-1-3 and the side surfaces 2-1-1, and reaches the edge zone at the other side of the three-dimensionally intersecting diverter, while the material originally in the edge zone flows from the outer port to the inner port of the adjacent conical cavities by baffling of the outer surface 2-1-2 and the side surfaces 2-1-1 of the conical cavities and reaches the central zone at the other side of the three-dimensionally intersecting diverter. When there are a number of three-dimensionally intersecting diverters arranged in a series inside the body of the pipe, barrel or tower, all the arranged angles of the three-dimensionally intersecting diverters should be kept consistent, so that each time the fluid flows through the three-dimensionally intersecting diverter, the fluid experiences a process of dividing-displacing-joining in the circumferential direction while interchanging the central zone and the edge zone in a radial direction. After flowing through a plurality of three-dimensionally intersecting diverters, any particles of the fluid in the pipe, barrel or tower will have the similar motion loci on the radial coordinate, and the difference of the residence time will be decreased, the radial temperature gradient will be eliminated, and the process requirements will be satisfied.

In order to eliminate the shortcut and backmixing completely, each of the inner contour lines or surfaces 4 at both ends of the three-dimensionally intersecting diverter can be elevated to the vertex of the inner contour lines or surfaces along the cylindrical surfaces they exist in, and forms a channel wall 5 which integrates with each of the conical cavities with abnormal shapes, as shown in FIG. 3.

The three-dimensionally intersecting diverter can be fabricated with the process of casting or welding, and etc. Also, the assembly of the three-dimensionally intersecting diverter with the pipe, barrel or tower can employ the method of tight fitting with temperature difference, tight fitting with taper, shrinking pipes or welding, and etc.

The three-dimensionally intersecting diverter of the present invention can be widely used, for example, as a static mixer in a fluid transmission pipe, a heat exchanger for fluid with high viscosity, an exit temperature homogenizer for the screw extruder, a high efficiency pipe reactor, and in fluid-fluid extraction, solid-fluid extraction, etc.

When the three-dimensionally intersecting diverter is used as an inner member in the heat exchanger for fluid with high viscosity, the outer surface 2-1-2 of the conical cavity with abnormal shape can be cast into a shape with thicker peripheral portions and thinner inner portions, to improve the heat transfer efficiency of the inner member.

The new generation of three-dimensionally intersecting diverters for inner members of a pipe, barrel or tower according to the present invention, has the following advantages:
1. simple structure and low fabrication cost;
2. high-mixing efficiency;
3. no flowing dead space or short cut;
4. low flowing resistance, especially suitable for the fluid with high viscosity;
5. stripping forcibly the boundary film completely and deeply, and having good heat transfer efficiency, and uniform temperature in the cross section of the pipe;
6. achieving the plug flowing, and increasing the volume efficiency of the pipe reactor and improving the molecular weight distribution of the polymer;
7. the number of the conical cavities may be adjusted to adapt to various process requirements.

DETAILED DESCRIPTION OF THE INVENTION

Figure 1:
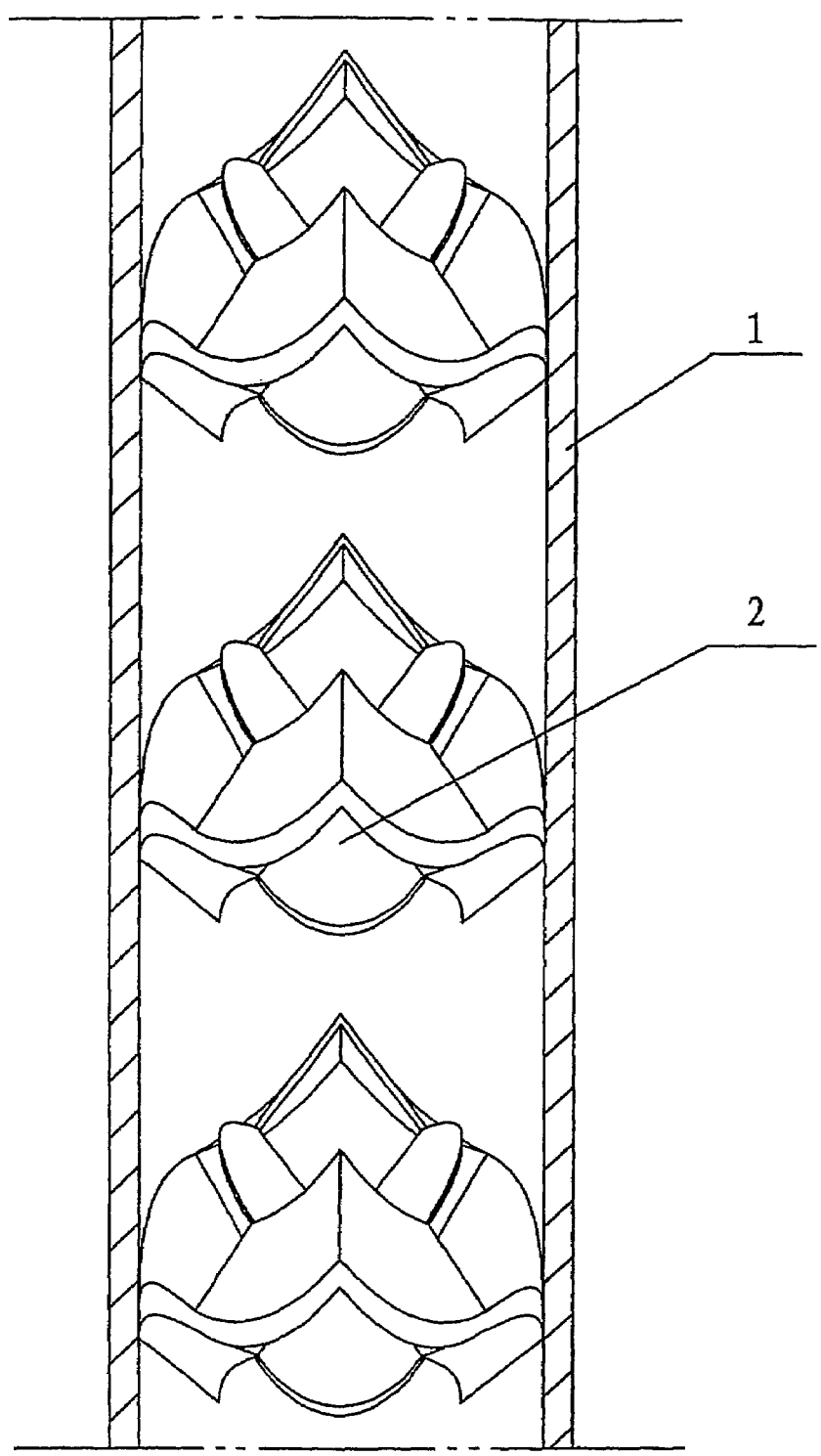
FIG. 1 is a structural representation of a plurality of the three-dimensionally intersecting diverters mounted in a pipe, barrel or tower.
Figure 2:
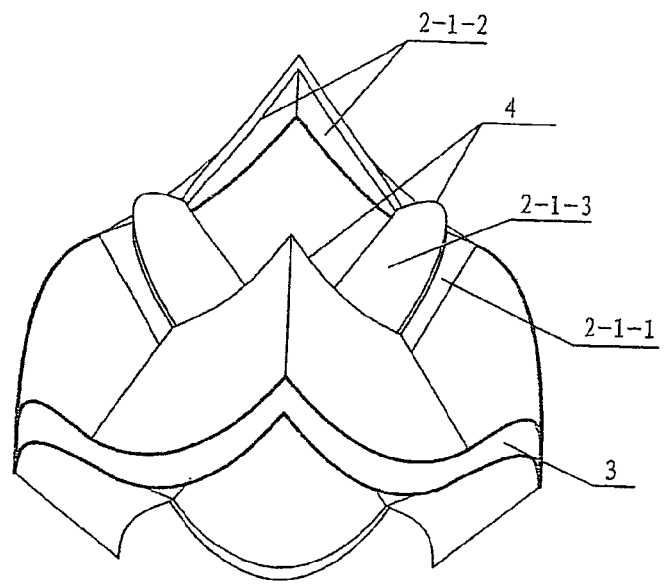
FIG. 2 is a schematic structural view of a single three-dimensionally intersecting diverter.
Figure 3:
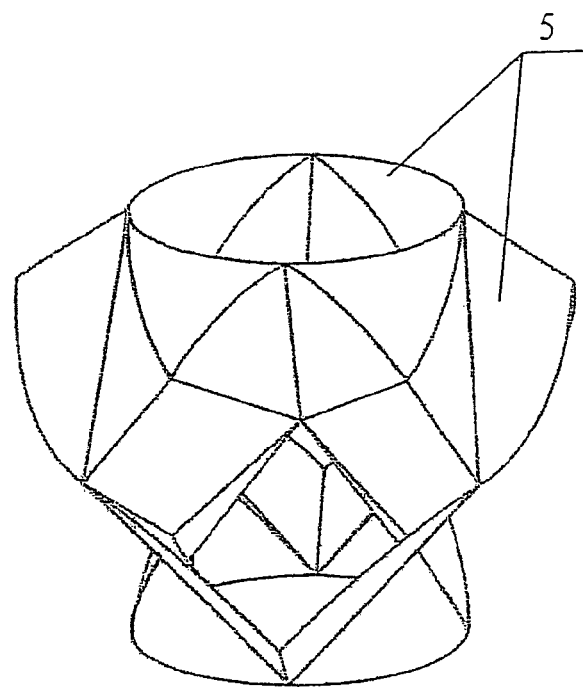
FIG. 3 is a schematic view of the cylindrical surface 5 at the end of the three-dimensionally intersecting diverter.

Two examples of the present invention are described as the following, while the scope of the present invention is not limited by the following examples.

Example 1

A Dg50 pipe of 2 m length is mounted inside with 40 three-dimensionally intersecting diverters which have the number of conical cavities of 4 and the length-to-diameter ratio of 1. A jacket is provided outside to transfer heat. This heat exchange pipe is used for cooling polymer. The heat conduction factor in the pipe is as 3.5-7.5 times as that in a pipe without the three-dimensionally intersecting diverter of the present invention, and the pressure drop in the pipe is as 5-10 times as that in a pipe without the three-dimensionally intersecting diverter.

Example 2

The maximum temperature difference in the section of the melt at the exit of the Dg100 screw extruder is 15° C. After being mounted with a temperature homogenizer with 7 three-dimensionally intersecting diverters which have the number of conical cavities of 4 and the length-to-diameter ratio of 1.0, the temperature difference is lowered to 1-2° C.

We claim:

1. A three-dimensionally intersecting diverter as an inner member for a pipe, a barrel or a tower for causing three-dimensionally intersecting flow of fluids passing therethrough, comprising:
one or more tiers of three-dimensionally intersecting diverters arranged in a pipe body, a barrel body or a tower body, each said three-dimensionally intersecting diverter including an even number of abnormal shaped conical cavities arranged annularly, wherein the even number is greater than 4 or equal to 4, and wherein each abnormal shaped conical cavity (2-1) has a larger port at the outer end and a smaller port at the inner end, all conical cavities converge at the midpoint of the axis of the three-dimensionally intersecting diverter, which is also the center of the three-dimensionally intersecting diverter, and wherein each conical cavity comprises two side surfaces (2-1-1), an outer surface (2-1-2) and an inner surface (2-1-3), wherein said side surfaces are quadrilateral plane or curved surfaces shared by two adjacent conical cavities, wherein said outer surface is a curved surface or a bent plane, and said inner surface is a sectorial cambered surface or plane or bent plane;

wherein the axial lines of all odd numbered conical cavities are distributed on a conical surface, with the intersection point of the axial lines being the vertex of the cone; and wherein the axial lines of all the even numbered conical cavities are distributed on another inverse conical surface, with the intersection point of the axial lines also being the vertex of the another cone;

wherein the intersection point of the axial lines of the odd numbered conical cavities and those of the even numbered conical cavities are located on each side of the center of the three-dimensionally intersecting diverter respectively and symmetric to each other;

wherein the projection of the outer contour surface (3) of the three-dimensionally intersecting diverter on a cross section plane of the three-dimensionally intersecting diverter is a rounded circle whose diameter is equal to the inner diameter of the matching pipe, barrel or tower, the projections of the lower and upper inner contour lines or surfaces (4) of the three-dimensionally intersecting diverter on a cross section plane of the three-dimensionally intersecting diverter is a circle or other closed curve which divides the section of the pipe, the barrel or the tower at both sides of the three-dimensionally intersecting diverter into two portions, with the inner portion being a central zone, the outer portion being an edge zone;

wherein as fluid material flows through the three-dimensionally intersecting diverter, the fluid material in said central and edge zones interchange position and produce three-dimensionally intersecting fluid flow;

wherein the ratio of the area of the central zone to the area of the edge zone is 0.1-4.2, and wherein the ratio of the height to the diameter of the three-dimensionally intersecting diverter is 0.2-3.

2. The three-dimensionally intersecting diverter of claim 1, wherein each said abnormal shaped conical cavity consists of two quadrilateral side surfaces (2-1-1) shared with the left and the right adjacent cavities, and an outer surface (2-1-2) composed of a curved surface or a bent flat surface.

3. The three-dimensionally intersecting diverter of claim 1, wherein the ratio of the area of the central zone to the area of the edge zone is 0.3-1.5, and the ratio of the height to the diameter of the three-dimensionally intersecting diverter is 0.6-1.2.

4. The three-dimensionally intersecting diverter of claim 1, wherein the outer contour of the three-dimensionally intersecting diverter is square, ellipse or another shape which matches with the pipe body, the barrel body or the tower body shaped in square, ellipse or another shape.

5. The three-dimensionally intersecting diverter of claim 1, wherein the outer surface (2-1-2) of said abnormal shaped conical cavities can be formed with thicker peripheral portions and thinner inner portions.

6. The three-dimensionally intersecting diverter of claim 1, wherein when there are a plurality of three-dimensionally intersecting diverters arranged in a series in the body of the pipe, barrel or tower, the arranged angles of the plurality of three-dimensionally intersecting diverters are consistent.

7. The three-dimensionally intersecting diverter of claim 1, wherein when the projections of the inner contour lines or surfaces (4) are circles, the inner contour lines or surfaces (4) at both ends of the three-dimensionally intersecting diverter are elevated to the highest position of the inner contour lines or surfaces along the cylindrical surfaces they exist in, and formed as circular pipe walls (5) which integrate with each of said abnormal shaped conical cavities.

8. The use of the three-dimensionally intersecting diverter as an inner member for a pipe, barrel or tower of claim 1 in manufacturing a static mixer, a pipe reactor, a heat exchanger for fluid with high viscosity and in the fluid-fluid extraction and the solid-fluid extraction.

9. A three-dimensionally intersecting diverter for arrangement within a pipe, a barrel or a tower having an inner wall, and causing three-dimensionally intersecting flow of fluids passing therethrough, said three-dimensionally intersecting diverter comprising:

an axis having a midpoint and a center; and an even number of abnormal-shaped conical cavities greater than or equal to 4, each said abnormal-shaped conical cavity being arranged annularly about the axis;

wherein all of the abnormal-shaped conical cavities converge at the midpoint of said axis, which is also the center of the three-dimensionally intersecting diverter;

wherein said three-dimensionally intersecting diverter has an outer contour that matches with the inner wall of the pipe, barrel or tower;

wherein the upper and the lower inner contour lines divide the section of a pipe, a barrel or a tower at both sides of the three-dimensionally intersecting diverter into a central zone and an edge zone; and wherein as fluid material flows through said three-dimensionally intersecting diverter, the fluid material in said central edge zones interchange position and produce three-dimensionally intersecting fluid flow.

10. The three-dimensionally intersecting diverter of claim 9, wherein the intersection point of the axial lines of the odd numbered abnormal-shaped conical cavities and the intersection point of the axial lines of the even numbered conical cavities are located to both sides of the center of the three-dimensionally intersecting diverter respectively and symmetrically with each other.

11. The three-dimensionally intersecting diverter of claim 10, wherein each said abnormal-shaped conical cavity comprises two quadrilateral side surfaces shared with the left and right adjacent conical cavities, an outer surface composed of a curved surface or a bent flat surface, and a sectorial inner surface.

12. The three-dimensionally intersecting diverter of claim 9, which efficiently improves heat transfer and mass transfer within the pipe, the barrel or the tower in which said three-dimensionally intersecting diverter is arranged.

13. The three-dimensionally intersecting diverter of claim 9, which is used in an environment selected from the group consisting of static mixers, heat exchangers for fluid with high viscosity, temperature homogenizers of the exit of the screw extruder, high efficiency pipe reactors, fluid-fluid extraction, and solid-fluid extraction.

* * * * *